United States Patent
Davis et al.

(10) Patent No.: US 9,314,969 B1
(45) Date of Patent: Apr. 19, 2016

(54) THREE-DIMENSIONAL PRINTER HAVING AN EXPANDABLE ENVELOPE

(71) Applicant: Lenovo Enterprise Solutions (Singapore) Pte. Ltd., Singapore (SG)

(72) Inventors: Alvin G. Davis, Durham, NC (US); William M. Megarity, Raleigh, NC (US); April E. Ruggles, Durham, NC (US); Paul A. Wormsbecher, Apex, NC (US)

(73) Assignee: Lenovo Enterprise Solutions (Singapore) Pte. Ltd.

( * ) Notice: Subject to any disclaimer, the term of this patent is extended or adjusted under 35 U.S.C. 154(b) by 42 days.

(21) Appl. No.: 14/520,669

(22) Filed: Oct. 22, 2014

Related U.S. Application Data (63) Continuation of application No. 14/518,405, filed on Oct. 20, 2014.

(51) Int. Cl.
| | |
|---|---|
| *G06F 19/00* | (2011.01) |
| *B29C 67/00* | (2006.01) |
| *B25J 9/00* | (2006.01) |
| *B33Y 10/00* | (2015.01) |
| *B29L 9/00* | (2006.01) |

(52) U.S. Cl.
CPC ............ *B29C 67/0055* (2013.01); *B25J 9/0096* (2013.01); *B29C 67/0059* (2013.01); *B29L 2009/00* (2013.01); *B33Y 10/00* (2014.12)

(58) Field of Classification Search
CPC ............... B25J 9/0096; B29C 67/0055; B29C 67/0059; G06F 19/00
USPC ................................ 264/308; 700/245; 901/1
See application file for complete search history.

(56) References Cited

U.S. PATENT DOCUMENTS

| | | | |
|---|---|---|---|
| 7,291,002 | B2 | 11/2007 | Russell et al. |
| 8,308,271 | B2 | 11/2012 | Seki et al. |
| 8,636,494 | B2 | 1/2014 | Gothait et al. |
| 2013/0015596 | A1 | 1/2013 | Mozeika et al. |
| 2013/0292039 | A1 | 11/2013 | Peters et al. |
| 2014/0052287 | A1 | 2/2014 | Swanson et al. |
| 2014/0054817 | A1 | 2/2014 | Jaffe |

OTHER PUBLICATIONS

Lipson et al., "Autonomous Self-Extending Machines for Accelerating Space Exploration", Cornell Computational Synthesis Lab, NIAC CP 01-02 Phase I, Oct. 2002, 25 pages.

(Continued)

*Primary Examiner* — Leo B Tentoni
(74) *Attorney, Agent, or Firm* — Katherine S. Brown; Jeffrey L. Streets (57) ABSTRACT

One embodiment of the present invention provides a method of three-dimensional printing. The method includes a three-dimensional printer printing a first layer of an object onto a surface that is not part of the three-dimensional printer, wherein the first layer is printed while a printing platform of the three dimensional printer is in a first position. The printer is autonomously repositioned in a second position elevated above the first position by being supported either on the three-dimensional object itself or on a scaffold printed separate from the object. The printer prints a second layer of the three-dimensional object onto the first layer of the three-dimensional object while the printing platform is in the second position. The printer may have a plurality of legs for controllably repositioning the printing platform.

20 Claims, 9 Drawing Sheets

(56) References Cited

OTHER PUBLICATIONS

"RT—Question More—Giant 3D printer could build homes in under a day" RT USA, http://rt.com/usa/3d-printed-concrete-house-727/, Jan. 16, 2014, 2 pages.

"How to Use MakerWare—MakerBot MakerWare", http://www.makerbot.com/support/makerware/documentation/usage/, Apr. 18, 2014, 3 pages.

NDTV Gadgets, "New giant 3D printer can build a house in 24 hours" New giant 3D printer can build a house in 24 hours |NDTV Gadgets, http://gadgets.ndtv.com/laptops/news/new-giant-3d-printer-can-build-a-house-in-24-hours- . . . , Copyright NDTV Convergence Limited 2014, Press Trust of India, Jan. 13, 2013, 6 pages.

THREE-DIMENSIONAL PRINTER HAVING AN EXPANDABLE ENVELOPE

CROSS-REFERENCE TO RELATED APPLICATIONS

This application is a continuation of U.S. patent application Ser. No. 14/518,405 filed on Oct. 20, 2014, which application is incorporated by reference herein.

BACKGROUND

1. Field of the Invention

The present invention relates to methods and apparatus for three dimensional printing.

2. Background of the Related Art

Three-dimensional (3D) printing is a process of making a three-dimensional object from a digital model using an additive process, where successive layers of material are laid down over previous layers. The material may be a thermoplastic polymer filament that is heated and extruded through a narrow nozzle. In one type of three dimensional printer, the nozzle, the table supporting the material, or both is moved to control where the material is deposited. Other types of three dimensional printers may use alternative mechanisms to control the position of a nozzle for dispensing the material.

3D printing has become a large industry with a growing number of printer manufacturers and web sites that provide construction plans in the form of a data file for downloading to a computer. Unfortunately, 3D printing is much more complex than 2D printing and requires much more time to produce an object. Objects that are printed at a fine level of detail or have significant size can take many hours to complete.

Various three-dimensional printing processes include Stereolithography (SLA), Selective Laser Sintering (SLS), Fused Deposition Modeling (FDM), Robocasting, Laser Engineered Net Shaping (LENS), Direct Metal Laser Sintering (DMLS), and Electron Beam Melting (EBM). The size of the three-dimensional printer determines the maximum size of an object that may be printed. If a larger object is desired, multiple parts of the object within the size limitations of the printer may be printed and then manually assembled together.

BRIEF SUMMARY

One embodiment of the present invention provides a method of three-dimensional printing. The method comprises a three-dimensional printer printing a first layer of a three-dimensional object onto a surface that is not part of the three-dimensional printer, wherein the first layer is printed while a printing platform of the three dimensional printer is in a first position. The method further comprises the three-dimensional printer printing a first layer of a scaffold separate from the first layer of the three-dimensional object. The three-dimensional printer is autonomously repositioned to be supported on the scaffold in a second position elevated above the first position, and a second layer of the three-dimensional object is printed onto the first layer of the three-dimensional object while the printing platform is in the second position.

Another embodiment of the present invention provides a method comprising a three-dimensional printer printing a first layer of a three-dimensional object onto a surface that is not part of the three-dimensional printer, wherein the first layer is printed while a printing platform of the three dimensional printer is in a first position, autonomously repositioning the printing platform of the three-dimensional printer to be supported on the three-dimensional object in a second position elevated above the first position, and printing a second layer of the three-dimensional object on the first layer of the three-dimensional object while the printing platform of the three-dimensional printer is in the second position.

DETAILED DESCRIPTION

One embodiment of the present invention provides a method of three-dimensional printing. The method comprises a three-dimensional printer printing a first layer of a three-dimensional object onto a surface that is not part of the three-dimensional printer, wherein the first layer is printed while a printing platform of the three dimensional printer is in a first position. The method further comprises the three-dimensional printer printing a first layer of a scaffold separate from the first layer of the three-dimensional object. The three-dimensional printer is autonomously repositioned to be supported on the scaffold in a second position elevated above the first position, and a second layer of the three-dimensional object is printed onto the first layer of the three-dimensional object while the printing platform is in the second position. Preferably, the three-dimensional printer will also print a second layer of the scaffold over the first layer of the scaffold while the printing platform is in the second position.

The surface that is not part of the three-dimensional printer may be a table top, floor or other suitable surface. In fact, the surface may be another object previously printed or another object to which the three dimensional object is to be added. Since the surface is not part of the three-dimensional printer, the object printed may or may not be separable from the surface.

The printing platform of the three-dimensional printer is typically a rigid frame or bracket that supports a mechanism for controllably positioning a print head. One non-limiting example of a positioning mechanism may utilize sets of guide rails and an x-axis motor, a y-axis motor, and a z-axis motor for controllably positioning the print head in three-dimensional (XYZ) space. An alternative example of a positioning mechanism may utilize an orbital bearing and motors to control the angle from vertical, the rotational angle, and the elevation. Regardless of the mechanism, three-dimensional printers deliver a working material through a print head or nozzle and move along a controlled path to deposit the working material in layers. While only a single layer may be printed or deposited at any point in time, one or more layers may be printed or deposited before repositioning the printing platform. For example, this may occur using a z-axis mechanism and motor that control the vertical position of the print head relative to the printing platform, whereas the repositioning of the printing platform is affected by separate mechanisms and motors, such as with a plurality of legs secured to the printing platform as described further below.

The scaffold printed in accordance with the present invention is not part of the three-dimensional object being printed. Accordingly, the scaffold may be printed around the perimeter of the three-dimensional object and does not interfere with the object being printed. The purpose of the scaffold or individual scaffold structures is to support the legs of the three-dimensional printer. Accordingly, the three-dimensional printer can print the scaffold structures needed for the printer to reposition itself, primarily in the vertical (z-axis) direction above the surface onto which the object is being printed or fabricated. Beneficially, the printer can print an object that is taller than otherwise possible with a printer of similar size.

Embodiments of the present invention provide a three-dimensional printer including a plurality of legs secured to the printing platform. The plurality of legs preferably includes a first subset of at least three legs and a second subset of at least three legs. Since each subset of legs includes at least three legs, the printing platform can be supported by one subset of legs while the other subset of legs is repositioning. The legs in each subset are preferably widely or uniformly spaced apart around the perimeter of the printing platform. For example, a subset of three legs may be spaced apart around the perimeter of a printing platform at angles of separation measuring about 120 degrees from a vertical axis through the center of the printing platform.

While a scaffold could completely encircle the object being printed, this would waste lots of material and time. Accordingly, the scaffold preferably includes a separate scaffold structure associated with each of the plurality of legs. For example, a three-dimensional printer having six legs may print six separate scaffold structures. Both the object being printed and the separate scaffold structures are printed in layers. Where the plurality of legs includes first and second subsets of legs, the scaffold may include a first subset of scaffold structures associated with the first subset of legs and a second subset of scaffold structures associated with the second subset of legs. Accordingly, the movement of the legs in a subset is coordinated with the printing of an associated subset of scaffold structures. Specifically, a first subset of legs supports the printing platform while the second subset of legs is moved out of alignment with the scaffold structures to allow printing on the scaffold structures associated with the second subset of legs. Similarly, the second subset of legs supports the printing platform while the first subset of legs is moved out of alignment with the scaffold structures to allow printing on the scaffold structures associated with the first subset of legs.

In one option, the step of autonomously repositioning the three-dimensional printer to be supported on the scaffold in a second position elevated above the first position, may include supporting the printing platform on the second subset of legs, articulating the first subset of the legs to engage the first subset of scaffold structures and support the printing platform in the first position while the first layer of the second subset of scaffold structures is printed, articulating the second subset of the legs to engage the second subset of scaffold structures and support the printing platform in the first position, and articulating the first subset of the legs to lift the printing platform from the first position to the second position. This optional sequence is beneficial in that the printing platform does not require its own z-axis control.

In another option, the step of autonomously repositioning the three-dimensional printer to be supported on the scaffold in a second position elevated above the first position, may include supporting the printing platform on the second subset of legs, and articulating the first subset of the legs to engage the first subset of scaffold structures and lift the printing platform to the second position before the first layer of the second subset of scaffold structures is printed. This optional sequence is beneficial in that the printing may proceed faster, but in order to continue the sequence to reposition the printer at higher levels it is necessary for the printing platform to have its own z-axis control in order to print first and second layers of the second subset of scaffold structures without repositioning the printing platform.

In another embodiment, each leg includes a scaffold print head for printing a scaffold structure to support the leg. Optionally, the end of the scaffold print head may also serve as a foot to support the leg on a scaffold structure. One benefit of this embodiment is that a layer of the scaffold structure may be printed at the same time that a layer of the three-dimensional object is printed. Another benefit of this embodiment is that the scaffold print heads may print the scaffold structures outside the range of the object print head. A further potential benefit is that it is possible for the scaffold print heads included with the first subset of legs to print scaffold structures simultaneously, and for the scaffold print heads included with the second subset of legs to print scaffold structures simultaneously. In one option, the step of printing a first layer of the three-dimensional object while the printer is supported on the first subset of scaffolds may include printing multiple layers of the three-dimensional object while the printer is supported on the first subset of scaffolds at a particular elevation, and the step of printing a second layer over the first layer of the three-dimensional object while the printer is supported on the second subset of scaffolds, includes printing multiple layers of the three-dimensional object while the printer is supported on the second subset of scaffolds at a particular elevation. In another option, the step of printing the second layer of the second subset of the scaffold structures may includes printing multiple layers on the the second subset of scaffold structures while the three-dimensional printer is supported on the first subset of scaffolds at a particular elevation, and the step of printing the second layer of the first subset of the scaffold structures, includes printing multiple layers on the first layer of the first subset of scaffold structures while the three-dimensional printer is supported on the second subset of scaffolds at the particular elevation.

The methods of the present invention may further comprise optically scanning the three-dimensional object after the three-dimensional printer is supported in the second position, and adjusting printing instructions for printing the second layer of the three-dimensional object after the three-dimensional printer is supported in the second position to account for changes in alignment of the printer relative to the three-dimensional object. For example, if the repositioning of the printing platform from a first position to a second position happens to shift the printing platform laterally in the x-direction by 3 millimeters, then the subsequent printing instructions that control the object print head attached to the printing platform should be adjusted by 3 millimeters in the opposite direction.

Yet another embodiment of the present invention provides a method comprising a three-dimensional printer printing a first layer of a three-dimensional object onto a surface that is not part of the three-dimensional printer, wherein the first layer is printed while a printing platform of the three dimensional printer is in a first position, autonomously repositioning the printing platform of the three-dimensional printer to be supported on the three-dimensional object in a second position elevated above the first position, and printing a second layer of the three-dimensional object on the first layer of the three-dimensional object while the printing platform of the three-dimensional printer is in the second position. This embodiment may incorporate features from the previous embodiments, but does not use separate scaffold structures. Rather, the printing platform is repositioned to be supported on that portion of the three-dimensional object that has already been printed. Accordingly, this embodiment does not consume print material, time and energy in constructing scaffold structures, but each subset of legs must be sequentially moved out of alignment with the three-dimensional object so that each layer of the three-dimensional object may be completely printed. In one option, the print instructions for the three-dimensional object may be modified in order to reinforce the strength of regions of the three-dimensional object that will support the weight of the three-dimensional printer.

In the foregoing method, the step of autonomously repositioning the printing platform of the three-dimensional printer to be supported on the three-dimensional object in a second position elevated above the first position, may include a second subset of at least three legs supporting the printing platform on the surface that is not part of the three-dimensional printer, articulating a first subset of the legs to engage the first layer of the three dimensional object and support the printing platform while the second layer of the three-dimensional object is printed. The method may then further comprise articulating the second subset of the legs to engage the second layer of the three-dimensional object and support the printing platform, articulating the first subset of the legs out of alignment with a region of the three-dimensional object where the first subset of the legs engaged the three-dimensional object, and printing in the region to complete the second layer of the three-dimensional object.

While three-dimensional printers have been designed to print various materials, one preferred type of material includes thermoplastic polymers. Various thermoplastic polymers may be used, including acrylonitrile butadiene styrene (ABS), polycarbonate (PC), polylactic acid (PLA), high density polyethylene (HDPE), PC/ABS, and polyphenylsulfone (PPSU).

A still further embodiment of the present invention provides a computer program product comprising a computer readable storage medium having program instructions embodied therewith, where the program instructions are executable by a processor to cause the processor to perform a method. The method comprises: a three-dimensional printer printing a first layer of a three-dimensional object onto a surface that is not part of the three-dimensional printer, wherein the first layer is printed while a printing platform of the three dimensional printer is in a first position; the three-dimensional printer printing a first layer of a scaffold separate from the first layer of the three-dimensional object; autonomously repositioning the three-dimensional printer to be supported on the scaffold in a second position elevated above the first position; and the three-dimensional printer printing a second layer of the three-dimensional object onto the first layer of the three-dimensional object while the printing platform is in the second position.

An additional embodiment of the present invention provides a computer program product comprising a computer readable storage medium having program instructions embodied therewith, where the program instructions are executable by a processor to cause the processor to perform a method. The method comprises: a three-dimensional printer printing a first layer of a three-dimensional object onto a surface that is not part of the three-dimensional printer, wherein the first layer is printed while a printing platform of the three dimensional printer is in a first position; autonomously repositioning the printing platform of the three-dimensional printer to be supported on the three-dimensional object in a second position elevated above the first position; and the three-dimensional printer printing a second layer of the three-dimensional object on the first layer of the three-dimensional object while the printing platform of the three-dimensional printer is in the second position.

The foregoing computer program products may further include program instructions for implementing or initiating any one or more aspects of the methods described herein. Accordingly, a separate description of the methods will not be duplicated in the context of a computer program product.

Figure 1:
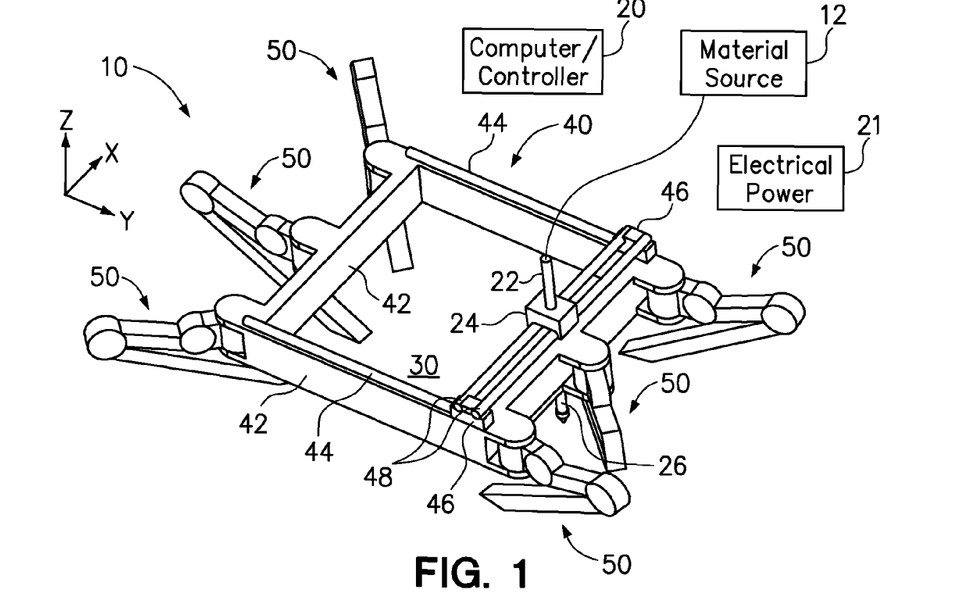
FIG. 1 is a perspective view of a three-dimensional printer.

FIG. 1 is a diagram of a three-dimensional printer 10. This three-dimensional printer 10 uses a material source 12 that supplies a material, such as a plastic, into a tube 22. The tube 22 is secured to a carriage 24 that may include a heater to heat and soften the plastic as it is pushed through the tube 22. The heated and softened plastic is then pushed through a print head 26 onto a surface 30, such as a table or floor, which is not a part of the printer. The position of the tip of the print head 26 determines where a thin layer of the plastic material will be placed.

The printer 10 includes a printing platform 40 in the form of a rigid rectangular frame having sides 42 that establish an area in which the carriage 24 and print head 26 can travel. Two of the sides 42 include guide rails 44 that constrain a pair of shuttles 46 to move along the guide rails 44 only in the y-direction. The shuttles 46 secure the ends of other guide rails 48 that constrain the carriage 24 to move along the other guide rails 48 only in the x-direction.

The printer 10 further includes a plurality of legs 50 secured around a perimeter of the printing platform 40. Each leg 50 is able to articulate and move as described in reference to FIGS. 3A and 3B, below. However, the legs 50 support and position the print platform 40 above the surface 30. A computer or other controller 20 is provided for controlling the position of the print head 26, such as controlling the xy position of the print head 26 relative to the printing platform 40 and controlling the z position of the printing platform 40 relative to the surface 30. A source of electrical power 21 is needed to operate various motors that control the movement of the print head 26 and the movement of the legs 50.

Figure 2:
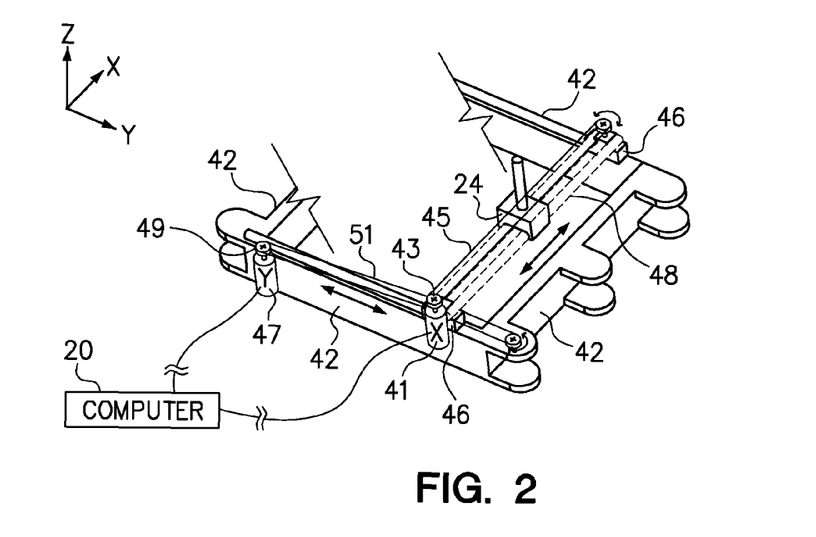
FIG. 2 is a schematic diagram of a subsystem for controlling two-dimensional movement of a print head.

FIG. 2 is a schematic diagram of subsystems for controlling two-dimensional movement of the carriage 24. The carriage 24 may be moved back and forth along an X-axis by an X-axis motor 41 that rotates a drive gear or pulley 43 to move a string or belt 45 to which the carriage 24 is attached. The direction and extent of rotation of the drive gear 43 determines the direction and distance that the carriage is moved. Similarly, the shuttles 46 may be moved back and forth along the Y-axis by a Y-axis motor 47 that rotates a drive gear or pulley 49 to move a string or belt 51 to which one of the shuttles is attached. The direction and extent of rotation of the drive gear 49 determines the direction and distance that the shuttles move. The computer 20 provides instructions to the printer 10 to operate the X-axis motor 41 and the Y-axis motor 47 in a manner that positions the print head where it can progressively fabricate the intended object. As each layer has been completed in the X-Y plane, the print head may be moved up or down along a Z-axis by a Z-axis motor that is secured to the carriage 24. However, the entire printing platform 40 may be moved in the Z-direction by the plurality of legs 50 as described below.

Figure 3A:
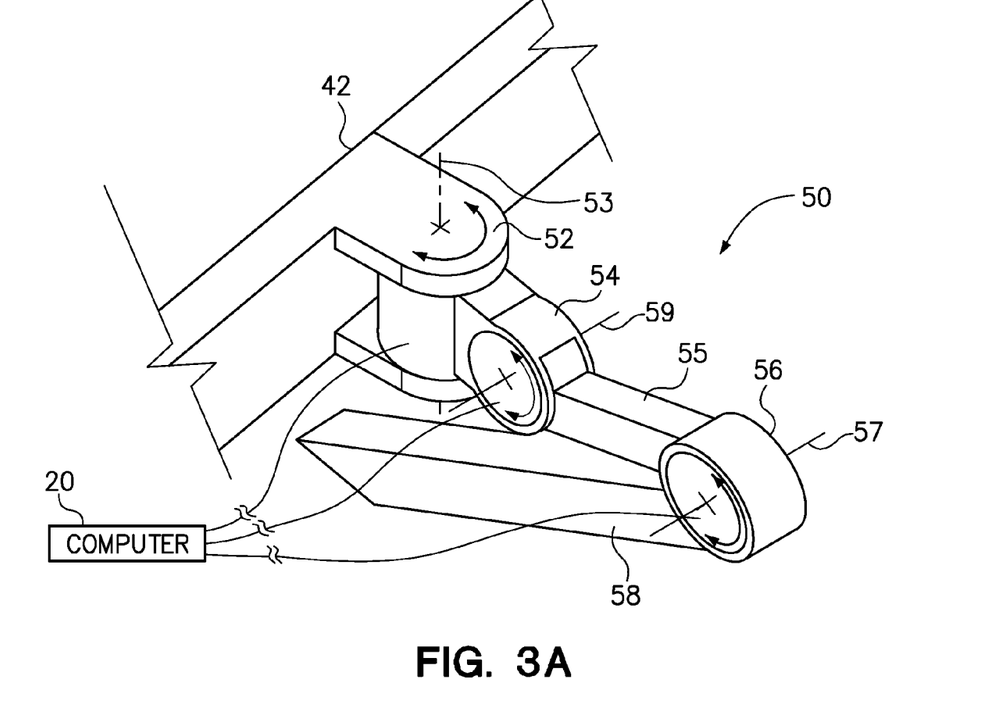
FIGS. 3A and 3B are perspective views of one leg of the three-dimensional printer in a retracted position and an extended position, respectively.
Figure 3B:
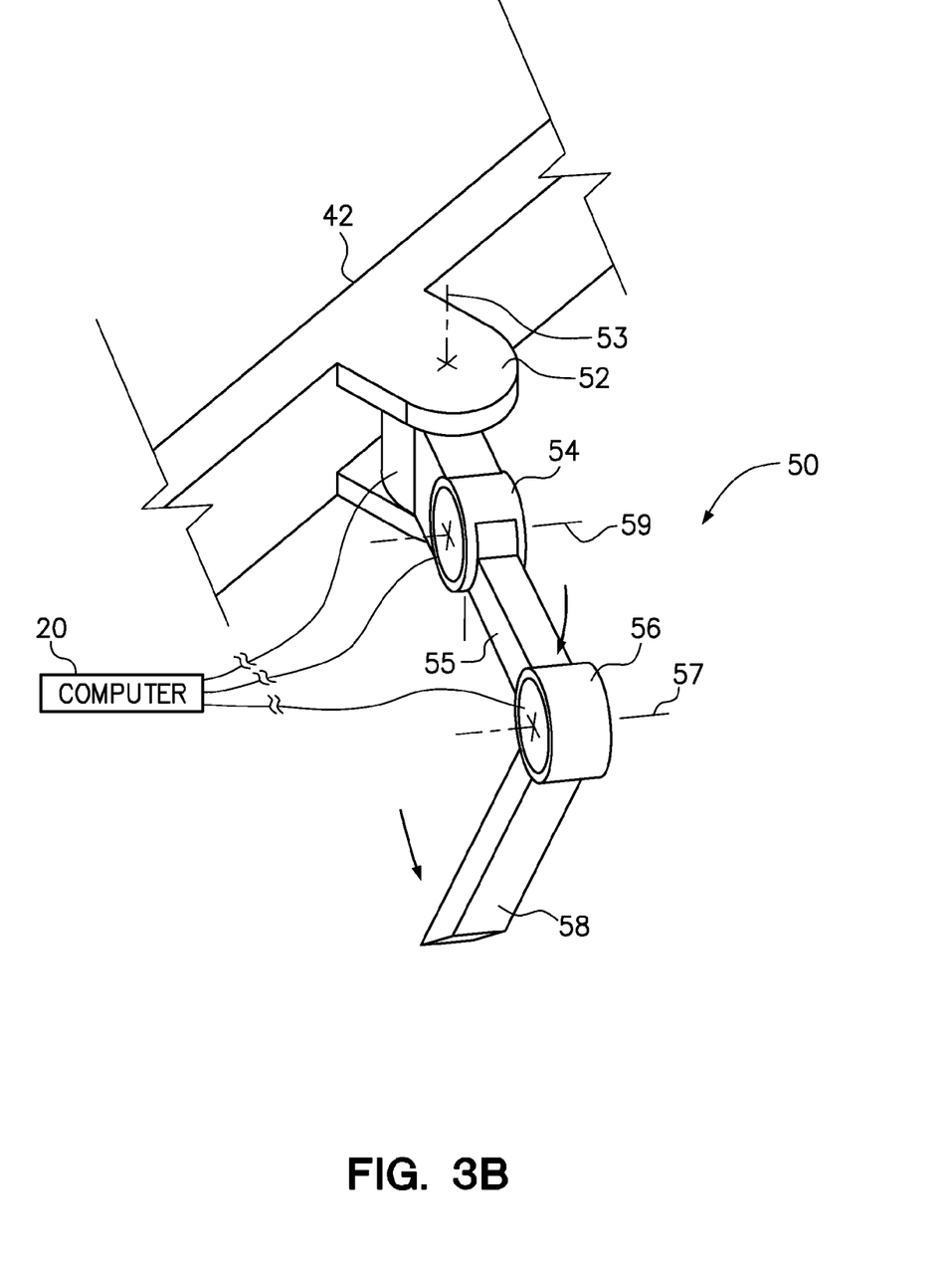

FIGS. 3A and 3B are perspective views of one leg 50 of the three-dimensional printer in a retracted position and an extended position, respectively. The computer 20 provides control signals to motors in or adjacent the pivot joints. A first joint or swivel 52 allows the leg to rotate about a vertical axis 53, a second joint 54 allows a distal segment 55 to move about a lateral axis 59, and a third joint 56 allows a further segment 58 to move about another lateral axis 57. The position of each of these joints 52, 54, 56 is independently controlled by the computer 20.

Figure 4:
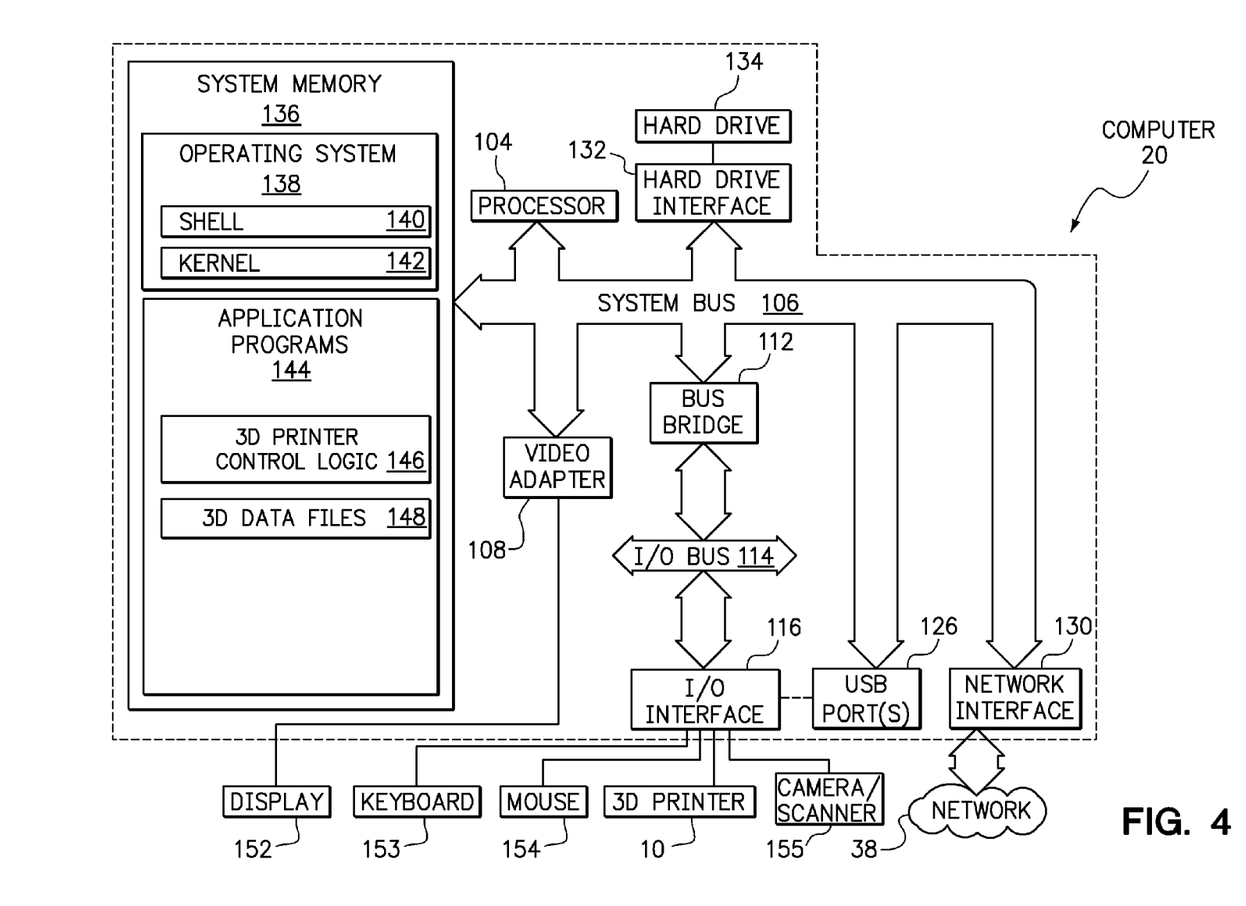
FIG. 4 is a diagram of a computer according to one embodiment of the present invention.

FIG. 4 is a diagram of an exemplary computer 20 that may be used in accordance with one embodiment of the present invention. The computer 20 includes a processor unit 104 that is coupled to a system bus 106. Processor unit 104 may utilize one or more processors, each of which has one or more processor cores. A video adapter 108, which drives/supports a display 152, is also coupled to system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 153, a mouse 154, a camera or scanner 155 and a 3D printer 10. The I/O devices may optionally include storage devices, such as CD-ROM drives and multi-media interfaces, other printers, and external USB port(s). While the format of the ports connected to I/O interface 116 may be any known to those skilled in the art of computer architecture, in a preferred embodiment some or all of these ports are universal serial bus (USB) ports. As depicted, the computer 20 is able to communicate over a network 38 using a network interface 130. The network 38 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in the computer 20. This volatile memory may include additional higher levels of volatile memory (not shown), including, but not limited to, cache memory, registers and buffers. Data that populates the system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 20 may include various programs and modules for implementing the methods described herein, such as the 3D printer control logic 146 and 3D object data files 148.

The hardware elements depicted in computer 20 are not intended to be exhaustive, but rather are representative components suitable to perform the processes of the present invention. For instance, computer 20 may include alternate memory storage devices such as magnetic cassettes, digital versatile disks (DVDs), Bernoulli cartridges, and the like. These and other variations are intended to be within the spirit and scope of the present invention.

Figure 5A:
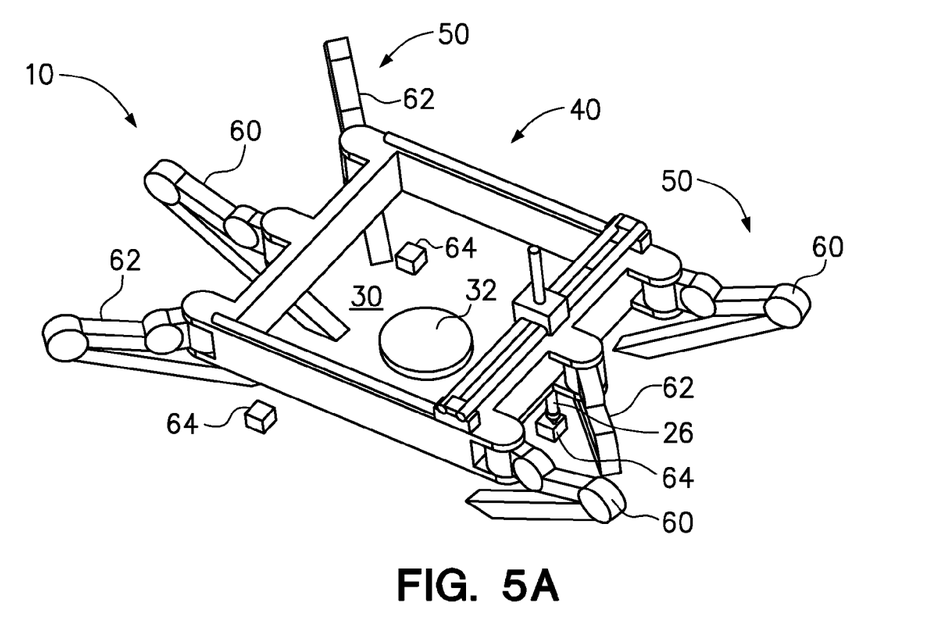
FIGS. 5A-5C illustrate the three-dimensional printer in a progression of initial steps building and using scaffold structures.
Figure 5B:
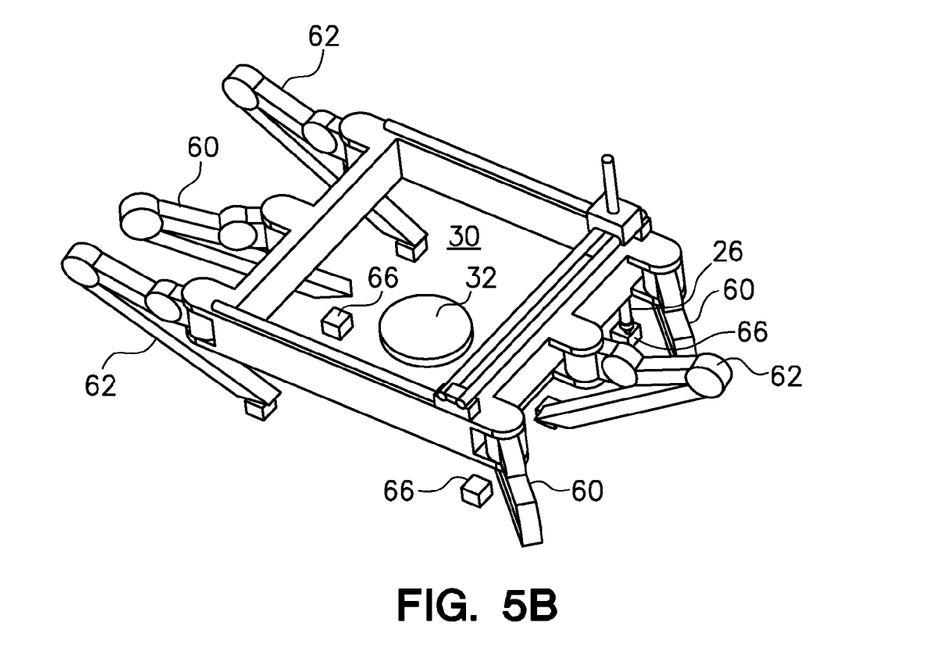
Figure 5C:
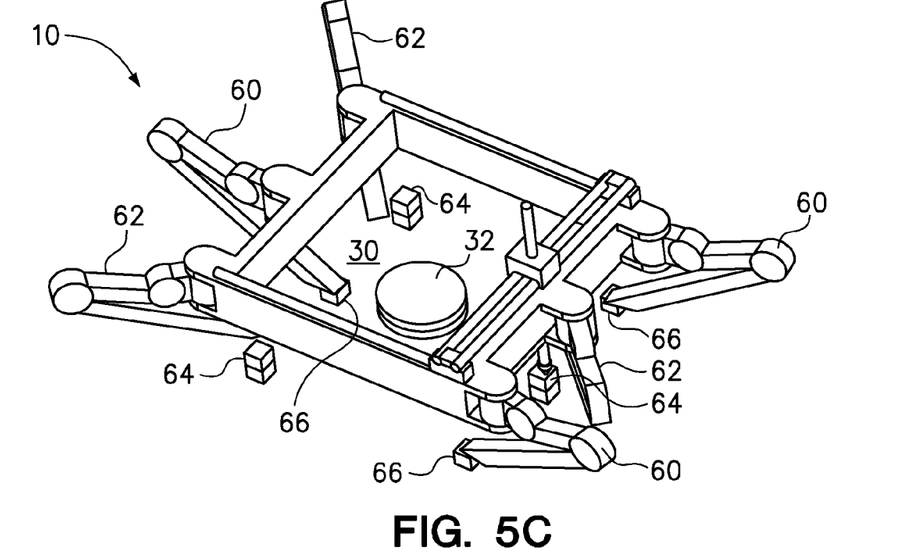

FIGS. 5A-5C illustrate the three-dimensional printer 10 in a progression of initial steps building and using scaffold structures. Furthermore, the legs 50 are controlled in subsets, including a first subset of legs 62 and a second subset of legs 60. In FIG. 5A, the second subset of legs 60 are supporting the printing platform 40 in a first position above the surface 30, such that the print head 26 has printed a first layer of an object 32 as well as a first layer of a first subset of three scaffold structures 64. In order to accommodate the printing of the scaffold structures 64, the first subset of legs 62 have been moved out of the way of the print head 26. More specifically, the first subset of legs 62 have moved out of alignment with the position on surface 30 that the scaffold structure 64 are to be printed. While the printing platform 40 is not receiving support from the first subset of legs 62, the platform 40 is supported by the second subset of legs 60 which are spaced apart around the perimeter of the platform 40. Although the scaffold structures 64 and the object 32 may be referred to as being one layer at this point, if the printing platform 40 has the capability to move the print head 26 in the z-direction relative to the printing platform 40 then the printed material shown may be multiple layers.

In FIG. 5B, the first subset of legs 62 have been articulated to move directly over the first subset of scaffold structures 64 and support the printing platform in the first position. Accordingly, the second subset of legs 60 are moved out of the way so that the print head 26 has been able to print a first layer of a second subset of scaffold structures 66.

With the first layer completed, FIG. 5C shows the beginning of a second layer. Here, the second subset of legs 60 have moved to engage the scaffold structures 66 and lift the printing platform 40 to a second position above the first position. Accordingly, the second subset of legs 60 are again supporting the printing platform 40, but in a second position above the surface 30, such that the print head 26 has been able to print a second layer of an object 32 as well as a second layer of the first subset of three scaffold structures 64. In order to accommodate the print head 26 printing the second layer of the scaffold structures 64, the first subset of legs 62 have been moved out of alignment with the scaffold structures 64. It should be recognized that the sequence described in reference to FIGS. 5A-5C may be repeated as desired to continue printing additional layers of the object 32 until the object is completed. There is no inherent or fixed maximum height of the object to be printed.

It should also be recognized that the sequence described in reference to FIGS. 5A-5C may also be incorporated in embodiments that do not use separate or dedicated scaffold structures 64, 66, but rather support the print platform by setting the legs on the object 32 itself. Accordingly, the object 32 may be considered to include the scaffold structures 64, 66. The legs 50 may be articulated to reach inwardly to the object 32 and treat a portion of the object 32 as a scaffold structure. Unlike a dedicated scaffold structure, the object may have a different layout from one layer to another, such that the positioning of each leg may change from layer to layer.

Figure 6A:
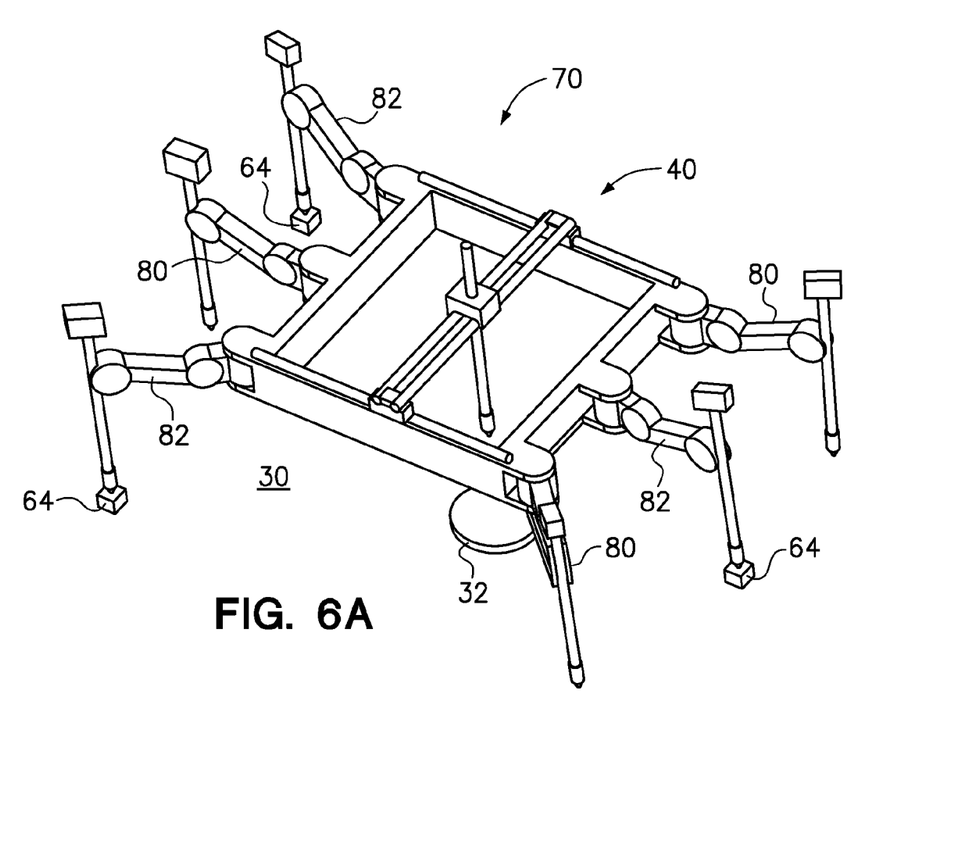
FIGS. 6A-6B illustrate another embodiment of a three-dimensional printer in a progression of initial steps building and using scaffold structures.
Figure 6B:
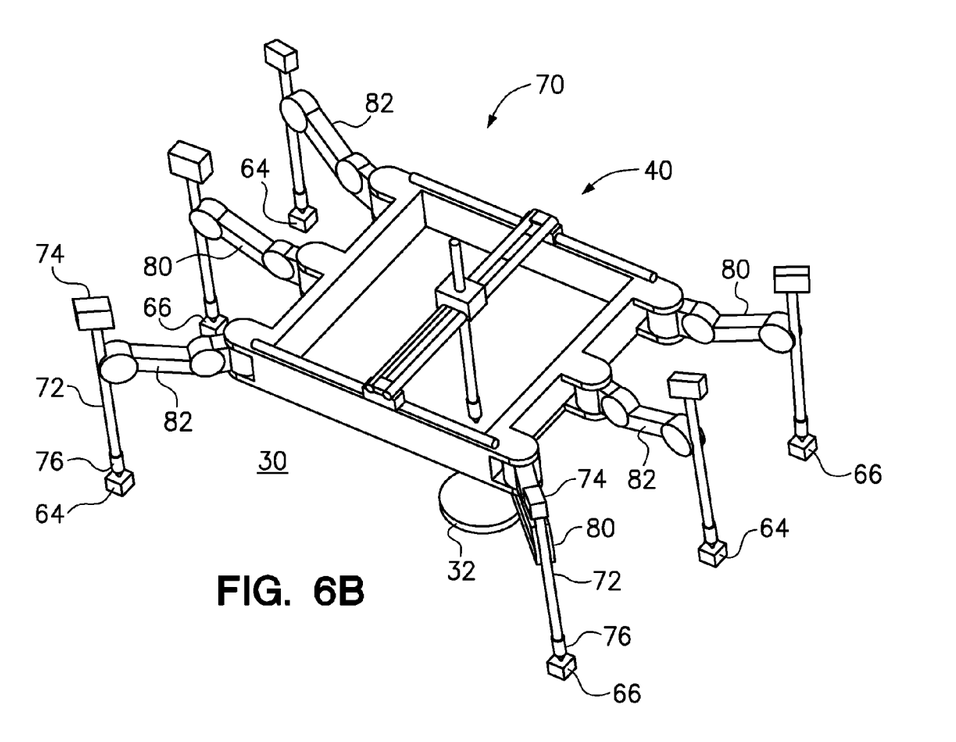

FIGS. 6A-6B illustrate another embodiment of a three-dimensional printer 70 in a progression of initial steps building and using scaffold structures. There may be various structural similarities between the present printer 70 and the previous printer 10, such that reference numbers used to describe the previous printer 10 may be reused to describe similar structures and components of the present printer 70. In particular, the printing platform 40 may be identical to that previously described.

The primary difference in the present printer 70 is that the distal leg segments 58 (see FIGS. 3A and 3B) have all been replaced with a scaffold print tube 72, a heat or extruder 74, and scaffold print head 76. The material source 12 (FIG. 1) or another material source may provide material to each of the scaffold print heads 76 as needed to print layers of the scaffold structures 64, 66.

FIG. 6A shows the printer 70 supported on the print heads 76 of a second subset of legs 80 while the other print heads 76, which are associated with a first subset of legs 82, print a layer of the first subset of scaffold structures 64. FIG. 6B shows the printer 70 supported on the print heads 76 of the first subset of legs 82 while the other print heads 76, which are associated with a second subset of legs 80, print a layer of the second subset of scaffold structures 66 and a layer of the object 32. The layer of the object 32 is shown as being printed while the printer is supported by second subset of legs 80, but it should be recognized that the layer of the object 32 could be also be printed while the printer is supported by the first subset of legs 82. Still further, where the object 32 takes longer to print than either of the scaffolds 64, 66, the object 32 may be partially printed while the printer is supported by second subset of legs 80 and completed while the printer is supported by the first subset of legs 82 or all of the legs 80, 82.

Figure 7A:
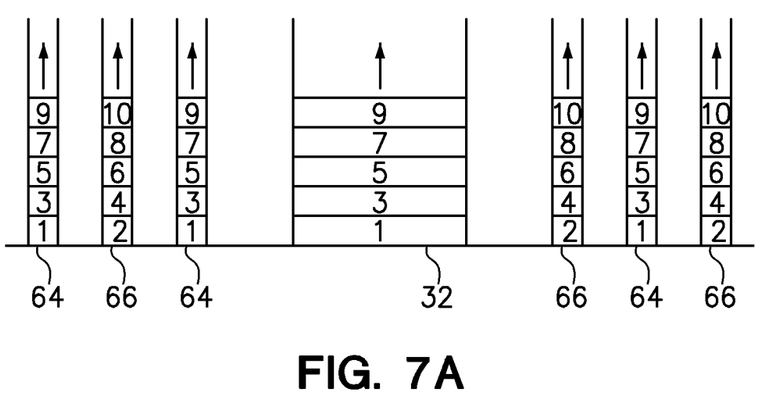
FIGS. 7A-7C are diagrams illustrating possible progression of printing steps.
Figure 7B:
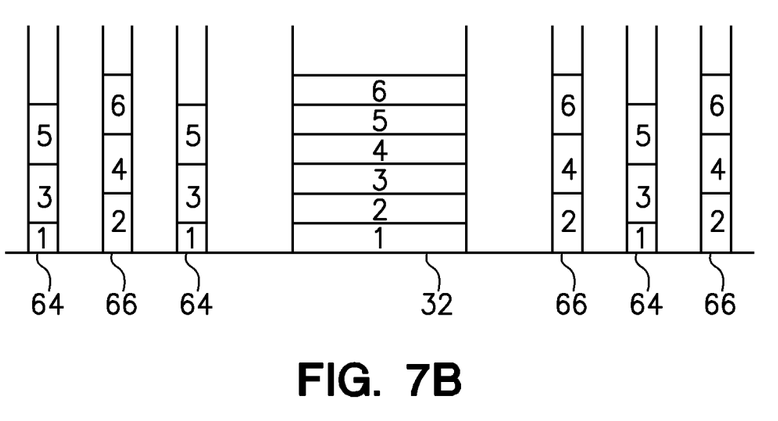
Figure 7C:
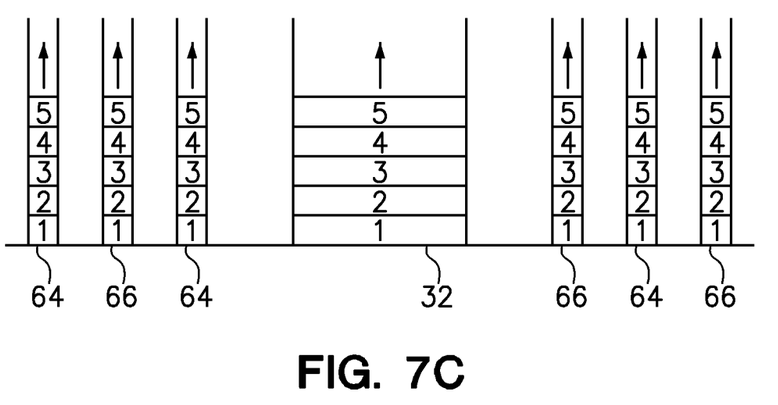

FIGS. 7A-7C are diagrams illustrating a few possible sequences of printing steps in which the material is printed in numerical order. FIG. 7A is consistent with FIGS. 5A-5C where the object 32 and the first subset of scaffold structures 64 are printed in a first step and the second subset of scaffold structures 66 are printed in a second step. This sequence may continue to fabricate the object 32 layer by layer, with the scaffolds 64, 66 also being fabricated layer by layer.

FIG. 7B illustrates another optional sequence where the printing platform is repositioned to the next higher position after every addition to a scaffold structure. However, this sequence requires the printing platform to provide the print head with its own z-axis control in order to print first and second layers of the second subset of scaffold structures 66 without repositioning the printing platform. After the initial layer of the first subset of scaffold structures 64, the scaffold structures 64, 66 are always printed two layers at a time. Accordingly, the print head 26 may prints a complete layer or nearly complete layer of the object every time that the printing platform is repositioned. This optional sequence is beneficial in that the printing may proceed faster.

FIG. 7C illustrates another optional sequence that is made possible using the printer 70 with scaffold print heads 76 on each of the legs (See FIGS. 6A-6B). In this sequence, each layer of the object 32 and scaffold structures 64, 66 are completed before the printing platform is repositioned higher.

Figure 8:
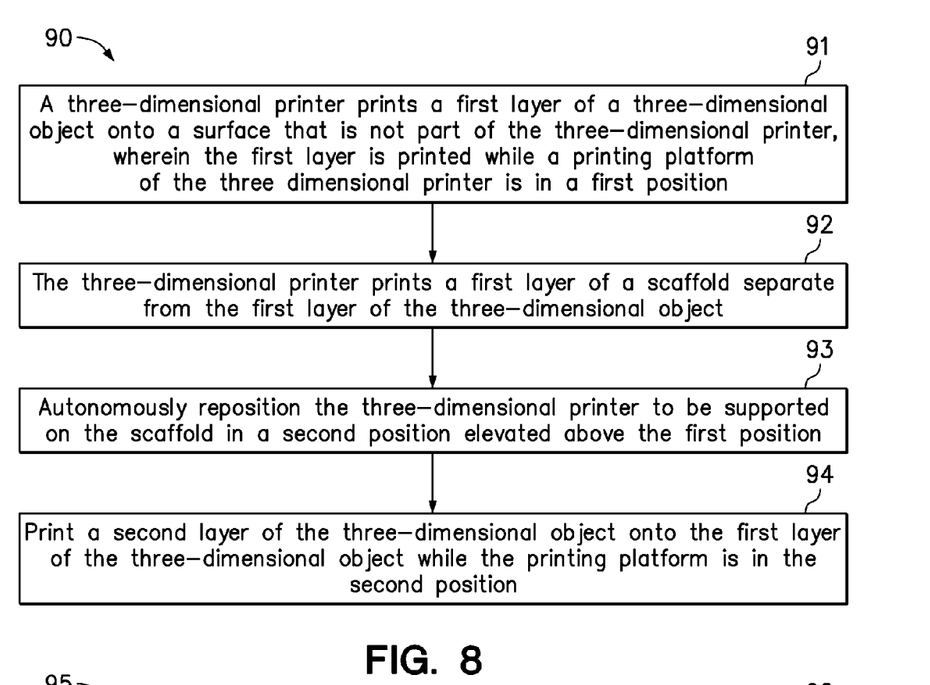
FIG. 8 is a flowchart of a method according to one embodiment of the present invention.

FIG. 8 is a flowchart of a method 90 according to one embodiment of the present invention. In step 91, a three-dimensional printer prints a first layer of a three-dimensional object onto a surface that is not part of the three-dimensional printer, wherein the first layer is printed while a printing platform of the three dimensional printer is in a first position. In step 92, the three-dimensional printer printing a first layer of a scaffold separate from the first layer of the three-dimensional object. In step 93, the three-dimensional printer is autonomously repositioned to be supported on the scaffold in a second position elevated above the first position. Step 94 includes printing a second layer of the three-dimensional object onto the first layer of the three-dimensional object while the printing platform is in the second position. Steps of the method may be repeated as needed to print a completed three-dimensional object, as may be described by a 3D data file.

Figure 9:
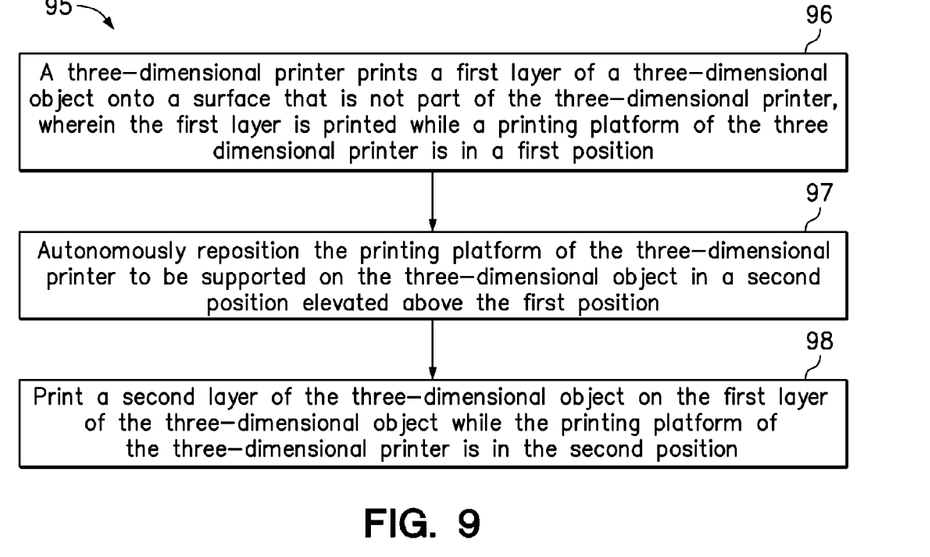
FIG. 9 is a flowchart of a method according to another embodiment of the present invention.

FIG. 9 is a flowchart of a method 95 according to another embodiment of the present invention. In step 96, a three-dimensional printer prints a first layer of a three-dimensional object onto a surface that is not part of the three-dimensional printer, wherein the first layer is printed while a printing platform of the three dimensional printer is in a first position. In step 97, the printing platform of the three-dimensional printer is autonomously repositioned to be supported on the three-dimensional object in a second position elevated above the first position. Step 98 then prints a second layer of the three-dimensional object on the first layer of the three-dimensional object while the printing platform of the three-dimensional printer is in the second position. Steps of the method may be repeated as needed to print a completed three-dimensional object, as may be described by a 3D data file.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    a three-dimensional printer printing a first layer of a three-dimensional object onto a surface that is not part of the three-dimensional printer, wherein the first layer is printed while a printing platform of the three dimensional printer is in a first position;
    the three-dimensional printer printing a first layer of a scaffold separate from the first layer of the three-dimensional object;
    autonomously repositioning the three-dimensional printer to be supported on the scaffold in a second position elevated above the first position; and
    printing a second layer of the three-dimensional object onto the first layer of the three-dimensional object while the printing platform is in the second position.

2. The method of claim 1, wherein the scaffold is printed around the perimeter of the three-dimensional object.

3. The method of claim 1, wherein the three-dimensional printer includes a plurality of legs secured to the printing platform.

4. The method of claim 3, wherein the plurality of legs include a first subset of at least three legs and a second subset of at least three legs.

5. The method of claim 4, wherein the scaffold includes a separate scaffold structure associated with each of the plurality of legs.

6. The method of claim 4, wherein the scaffold includes a first subset of scaffold structures associated with the first subset of legs and a second subset of scaffold structures associated with the second subset of legs.

7. The method of claim 6, wherein autonomously repositioning the three-dimensional printer to be supported on the scaffold in a second position elevated above the first position, includes:
supporting the printing platform on the second subset of legs;
articulating the first subset of the legs to engage the first subset of scaffold structures and support the printing platform in the first position while the first layer of the second subset of scaffold structures is printed;
articulating the second subset of the legs to engage the second subset of scaffold structures and support the printing platform in the first position; and
articulating the first subset of the legs to lift the printing platform from the first position to the second position.

8. The method of claim 6, wherein autonomously repositioning the three-dimensional printer to be supported on the scaffold in a second position elevated above the first position, includes:
supporting the printing platform on the second subset of legs; and
articulating the first subset of the legs to engage the first subset of scaffold structures and lift the printing platform to the second position before the first layer of the second subset of scaffold structures is printed.

9. The method of claim 1, further comprising:
while the printing platform is in the second position, the three-dimensional printer printing a second layer of the three-dimensional object over the first layer of the three-dimensional object and a second layer of the scaffold over the first layer of the scaffold.

10. The method of claim 7, further comprising:
moving the first subset of the legs out of alignment with the first subset of scaffold structures to allow printing a second layer of the first subset of scaffold structures on the first layer of the first subset of scaffold structures; and
moving the second subset of the legs out of alignment with the second subset of scaffold structures to allow printing a second layer of the second subset of scaffold structures on the first layer of the second subset of scaffold structures.

11. The method of claim 3, wherein each leg includes a scaffold print head for printing a scaffold structure to support the leg.

12. The method of claim 11, wherein the scaffold print head prints the scaffold structure outside the range of the object print head.

13. The method of claim 11, wherein the scaffold print heads included with the first subset of legs print scaffold structures simultaneously, and wherein the scaffold print heads included with the second subset of legs print scaffold structures simultaneously.

14. The method of claim 11, wherein printing a first layer of the three-dimensional object while the printer is supported on the first subset of scaffolds, includes printing multiple layers of the three-dimensional object while the printer is supported on the first subset of scaffolds at a particular elevation; and
wherein printing a second layer over the first layer of the three-dimensional object while the printer is supported on the second subset of scaffolds, includes printing multiple layers of the three-dimensional object while the printer is supported on the second subset of scaffolds at a particular elevation.

15. The method of claim 14, wherein printing the second layer of the second subset of the scaffold structures, includes printing multiple layers on the second subset of scaffold structures while the three-dimensional printer is supported on the first subset of scaffolds at a particular elevation; and
wherein printing the second layer of the first subset of the scaffold structures, includes printing multiple layers on the first layer of the first subset of scaffold structures while the three-dimensional printer is supported on the second subset of scaffolds at the particular elevation.

16. The method of claim 1, further comprising:
optically scanning the three-dimensional object after the three-dimensional printer is supported in the second position; and
adjusting printing instructions for printing the second layer of the three-dimensional object after the three-dimensional printer is supported in the second position to account for changes in alignment of the printer relative to the three-dimensional object.

17. A method, comprising:
a three-dimensional printer printing a first layer of a three-dimensional object onto a surface that is not part of the three-dimensional printer, wherein the first layer is printed while a printing platform of the three dimensional printer is in a first position;
autonomously repositioning the printing platform of the three-dimensional printer to be supported on the three-dimensional object in a second position elevated above the first position; and
printing a second layer of the three-dimensional object on the first layer of the three-dimensional object while the printing platform of the three-dimensional printer is in the second position.

18. The method of claim 17, further comprising:
modifying print instructions for the three-dimensional object to reinforce the strength of regions of the three-dimensional object that will support the three-dimensional printer.

19. The method of claim 17, wherein autonomously repositioning the printing platform of the three-dimensional printer to be supported on the three-dimensional object in a second position elevated above the first position, includes:
a second subset of at least three legs supporting the printing platform on the surface that is not part of the three-dimensional printer; and
articulating a first subset of the legs to engage the first layer of the three dimensional object and support the printing platform while the second layer of the three-dimensional object is printed.

20. The method of claim 19, further comprising:
articulating the second subset of the legs to engage the second layer of the three-dimensional object and support the printing platform;

articulating the first subset of the legs out of alignment with a region of the three-dimensional object where the first subset of the legs engaged the three-dimensional object; and printing in the region to complete the second layer of the three-dimensional object.

\* \* \* \* \*